(12) United States Patent
Schober et al.

(10) Patent No.: US 12,287,394 B2
(45) Date of Patent: Apr. 29, 2025

(54) DISTANCE ASSESSMENT WITH HEADERLESS PACKETS

(71) Applicant: NXP B.V., Eindhoven (NL)

(72) Inventors: Michael Schober, Graz (AT); Manuel Lafer, Ottendorf (AT); Pablo Corbalán Pelegrín, Callosa de Segura (ES)

(73) Assignee: NXP B.V., Eindhoven (NL)

( * ) Notice: Subject to any disclaimer, the term of this patent is extended or adjusted under 35 U.S.C. 154(b) by 398 days.

(21) Appl. No.: 18/082,393

(22) Filed: Dec. 15, 2022

(65) Prior Publication Data

US 2024/0201361 A1    Jun. 20, 2024

(51) Int. Cl.
| | | |
|---|---|---|
| *G01S 13/76* | (2006.01) | |
| *B60R 25/24* | (2013.01) | |
| *H04L 43/0864* | (2022.01) | |
| *H04L 43/106* | (2022.01) | |
| *B60R 25/04* | (2013.01) | |

(52) U.S. Cl.
CPC ............ *G01S 13/765* (2013.01); *B60R 25/24* (2013.01); *H04L 43/0864* (2013.01); *H04L 43/106* (2013.01); *B60R 25/04* (2013.01)

(58) Field of Classification Search
CPC .. G01S 13/765; H04L 43/0864; H04L 43/106
See application file for complete search history.

(56) References Cited

U.S. PATENT DOCUMENTS

| | | |
|---|---|---|
| 2018/0059235 A1 | 3/2018 | McLaughlin et al. |
| 2018/0254870 A1 | 9/2018 | Dutz et al. |
| 2018/0254925 A1 | 9/2018 | Dutz et al. |
| 2020/0014526 A1 | 1/2020 | Hammerschmidt et al. |
| 2020/0348409 A1 | 11/2020 | McLaughlin et al. |
| 2021/0099863 A1* | 4/2021 | Naguib ................. H04W 12/63 |
| 2022/0099790 A1 | 3/2022 | Lim |
| 2022/0295430 A1 | 9/2022 | Schober et al. |
| 2022/0299621 A1 | 9/2022 | Werner et al. |

OTHER PUBLICATIONS

P. Corbalan and G. P. Picco. : Ultra-wideband Concurrent Ranging. In ACM Transactions on Sensor Networks (TOSN), vol. 1, No. 1, Article 1, Jan. 2020, pp. 1-40.

(Continued)

*Primary Examiner* — Curtis B Odom (57) ABSTRACT

Aspects of the present disclosure are directed to communicating data for authentication and location determination, such as for authenticating a key FOB and locating the key FOB within a defined distance. As may be implemented in accordance with one or more embodiments, a plurality of headerless packets, respectively including scrambled timestamp sequence (STS) packets but not including encoding and/or synchronization headers, are communicated between respective communication circuits. A time of flight (TOF) value indicative of time elapsed between transmission and reception of the plurality of headerless packets is assessed based on the STS packets. A distance between the communication circuits is determined based on the assessed time of flight.

20 Claims, 5 Drawing Sheets

(56) References Cited

OTHER PUBLICATIONS

D. Vecchia, P. Corbalan, T. Istomin and G. P. Picco, "Playing with Fire: Exploring Concurrent Transmissions in Ultra-wideband Radios." 2019 16th Annual IEEE International Conference on Sensing, Communication, and Networking (SECON), 2019, pp. 1-9.
FiRa Consortium. FiRa Consortium UWB MAC Technical Requirements, Version 1.3.0, pp. 1-79 (Jan. 2022).
Giridhar Mandyam et al. UWB Secure Ranging in FiRa, FiRa Consortium, pp. 1-13 (Aug. 2022).
Car Connectivity Consortium LLC. Digital Key Technical Specification Release 3, Version 1.0.0 (CCC-TS-101), pp. 1-469 (2021).
IEEE, Inc. IEEE Standard for Low-Rate Wireless Networks. IEEE Std 802.15.4™-2020 (Revision of IEEE Std 802.15.4-2015), pp. 1-800 (2020).
IEEE, Inc. IEEE Standard for Low-Rate Wireless Networks, Amendment 1: Enhanced Ultra Wideband (UWB) Physical Layers (PHYs) and Associated Ranging Techniques. IEEE Std 802.15.4z™-2020 (Amendment to IEEE Std 802.15.4™-2020), pp. 1-174 (2020).

\* cited by examiner

DISTANCE ASSESSMENT WITH HEADERLESS PACKETS

OVERVIEW

Aspects of various embodiments are directed to determining distances between communication circuits using headerless packets.

Many communication technologies utilize ultra wideband (UWB) radio technology having a wide signal bandwidth, for instance greater than 500 MHz or greater than 20% of the carrier frequency of transmitted signals. Because of this large signal bandwidth, receiving and transmitting a UWB signal may be expensive from a power consumption perspective.

Ranging schemes between devices may utilize an initiator and a responder, as may include an anchor system in which one or more anchors may perform initiator and/or responder roles, as may be applicable to different ranging rounds or times. Such ranging schemes may involve ranging message exchanges in which information is transmitted to facilitate synchronization so that a receiver can identify when an STS (secure training sequence) starts. In addition to the STS, such messages may include a synchronization header having SYNC and SFD (start-of-frame delimiter) portions. Unfortunately, SYNC and SFD data may take more RF-on time than the actual STS, resulting in high energy consumption by receivers. Further, isolation between different SYNC codes may be limited (e.g., <18 dB) which makes concurrent or simultaneous packet transmissions between different devices complicated. This may further increase the packet error rate in dense environments where multiple devices may exist.

These and other matters have presented challenges to efficiencies of communication technologies, for a variety of applications such as ranging.

SUMMARY

Various example embodiments are directed to issues such as those addressed above and/or others which may become apparent from the following disclosure, as may concern determining distance between respective communication circuits. In certain example embodiments, aspects of the present disclosure involve communicating scrambled timestamp sequence (STS) packets and utilizing those packets for determining distance/ranging. Headerless, STS-only packets may be communicated and utilized in this context, such that the start of each received packet corresponds to the start of STS data in the packet.

In a more specific example embodiment, a plurality of headerless packets are communicated between respective communication circuits, the headerless packets respectively including scrambled timestamp sequence (STS) packets but not including encoding headers. A time of flight (TOF) value indicative of time elapsed between transmission and reception of the plurality of headerless packets is assessed based on the STS packets, and a distance between the communication circuits is determined based on the assessed time of flight.

In another specific example embodiment, an apparatus includes a first communication circuit to communicate a plurality of headerless packets, respectively including STS packets but not including encoding headers, with a second communication circuit. Processing circuitry is configured to assess a TOF value indicative of time elapsed between transmission and reception of the plurality of headerless packets based on the STS packets, and is further configured to determine a distance between the communication circuits based on the assessed time of flight.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving assessment of distance between respective communication circuits. For instance, specific aspects may be useful in connection with authenticating a key FOB for an automobile, for providing access to the automobile and/or enabling operation of the automobile. In certain implementations, aspects of the present disclosure have been shown to be beneficial when used in the context of assessing distance to a key FOB using headerless packets that exclude encoding headers, thus facilitating communication of a reduced amount of data and related processing relative to data that utilizes headers. In some embodiments, such an approach involves using STS-only packets, which facilitates ascertaining the start of the STS-only packet as the initial data received for the packet. Certain embodiments utilize a multi-receiver (multi-RX) for receiving multiple frames in parallel, and other embodiments utilize single receiver (single-RX) architectures. While not necessarily so limited, various aspects may be appreciated through the following discussion of non-limiting examples that use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments involve a reduction of power consumption in connection with Ultra-Wideband (UWB) technology, which utilizes a large signal bandwidth for time of flight (TOF) estimation. To enable secure ranging, a timestamp calculation may be done based on a scrambled timestamp sequence (STS), which may be cryptographically generated. The TOF estimation is carried out using STS-only packets without a synchronization header. This may reduce packet length by two times relative to the use of headers and related synchronization, halving airtime and RF-on time, and ultimately decreasing power consumption. The reduced airtime may facilitate an increase in transmit power, which may result in a link budget increase. Certain particular embodiments employ an STS-only packet based ranging scheme that allows for parallel packet transmissions, which shortens the ranging round duration and thus the power consumption for multi-receiver architectures.

Certain embodiments are directed to ranging, as may involve assessing distance between an initiator and a responder (or anchor system), such as between a key FOB and automobile for opening a door or otherwise enabling the automobile. Ranging may be carried out using headerless STS-only packets, reducing energy usage as may otherwise occur using packets with headers (e.g., having SYNC and/or other data), which may require assessment of the start of STS data in the packets. Multiple such STS-only packets may be transmitted in parallel, which may also reduce the time during which one or more communication circuits needs to be powered.

As utilized herein, a key FOB may be implemented in a variety of manners. For instance, a key FOB may be a physical circuit designed for use in accessing and/or enabling a vehicle. A key FOB may be implemented in a hand-held device such as a mobile phone or smart phone, with circuitry therein operable to carry out functions and operations as characterized herein.

In a particular embodiment, the initiator may start a ranging message exchange by sending a Pre-poll message, followed by a Poll message. The Pre-Poll message may contain information for setting up the ranging message exchange, and may facilitate synchronization-type operations for facilitating communication (and synchronizing such communications where applicable). The Poll message is the first message within the ranging exchange that is used for secure timestamp estimation, and may include STS-only packets. After receiving this message, the anchor system (which may include multiple anchors) sends out a response per anchor. These communications may utilize IEEE 802.15.4z type packets. The timestamp measurement and TOF calculation may be done based on the STS segments in accordance with security requirements for secure ranging. Accordingly, this timestamp measurement may be carried out without using data such as SYNC (synchronization) and SFD (start-of-frame delimiter) data as often otherwise utilized in packet headers, reducing RF-on time and related energy consumption. Furthermore, utilizing STS-only packets may mitigate issues with isolation between different SYNC codes, facilitating parallel packet transmission. Utilizing STS-only packets may further reduce packet error rates in dense environments where multiple devices are communicating without any knowledge about their coexistence (e.g., in automotive environments), which may also reduce energy consumption otherwise needed for addressing such errors.

Accordingly, STS-only packets may be utilized in ranging packet exchanges, which reduces active RF-on power consumption (e.g., by a factor of 2) on an initiator and/or responder side of communications. The average transmission power of the packet may be increased (e.g., since the packet duration is reduced), which may increase the link budget of the ranging packets. Using STS-only packets may mitigate frame collisions, facilitating ranging with multi-receiver devices utilizing parallel transmissions, which may shorten ranging message exchanges, reduce power consumption, and improve scheduling granularity, and further facilitating coexistence between devices.

In accordance with a more particular embodiment, headerless packets are communicated between respective communication circuits, in which the headerless packets include STS packets and do not include encoding headers. A TOF value indicative of time elapsed between transmission and reception of the headerless packets is assessed using the STS packets (e.g., without using synchronization data), for instance based on a frequency offset between respective communication circuits. The distance between the communication circuits is determined based on the assessed time of flight. The headerless packets may include a group or stream of bits, irrespective of whether the bits are in a fixed size or are in a contiguous sequence, that does not provide a code used in any part of the group or stream of bits to encode data, for synchronization, identification and/or recognition of a packet, in communications to one of the communication circuits.

The TOF may be determined using a variety of approaches. In a particular embodiment, the start of the STS packets is determined based on a ranging protocol specifying that STS-only packets without headers are being transmitted, therein facilitating identification of the start of the STS packets without utilization of a packet header.

In some embodiments, a pre-poll message is communicated prior to communicating the headerless packets, and used for timestamp synchronization. The TOF value may be assessed based on a frequency offset between the respective communication circuits, which may be based on a delay time between reception of the pre-poll message and the headerless packets.

In certain implementations, respective ones of the headerless packets are communicated in parallel and the TOF value is assessed utilizing the packets communicated in parallel. Such implementations may be carried out using multi-receiver circuitry to concurrently receive different packets communicated in parallel.

The aforementioned communications circuits may be implemented in a variety of manners. In a particular instance, one of the communication circuits is a key FOB and the other one of the communication circuits is based in an automobile and includes processing circuitry that carries out operations for assessing TOF and distance therefrom. The communication circuit based in the automobile may utilize the determined distance and security data communicated from the key FOB to enable operation of the automobile in response to the key FOB being within a defined proximity of the automobile and the security data authenticating the key FOB.

In another specific example embodiment, an apparatus includes a first communication circuit that communicates a plurality of headerless packets with a second communication circuit, the packets being STS packets and not including encoding headers. Processing circuitry is configured to assess a TOF value indicative of time elapsed between transmission and reception of the plurality of headerless packets based on the STS packets (e.g., without using synchronization data), and is further configured to determine a distance between the communication circuits based on the assessed time of flight. Such an approach may involve, for example, a receiver having the second communication circuit that receives the headerless packets and the processing circuitry that processes the packets to determine a distance from the receiver to a transmitter that transmits the packets, based on the TOF value. Certain embodiments are directed to a system that includes such a receiver and a transmitter that transmits the headerless packets.

The headerless packets may include a group or stream of bits, irrespective of whether the bits are in a fixed size or are in a contiguous sequence, that does not provide a code used in any part of the group or stream of bits to encode data, for synchronization, identification and/or recognition of a packet, in communications to one of the communication circuits.

The processing circuitry may be configured to determine the time of flight value by identifying the start of the STS packets based on a ranging protocol specifying that STS-only packets without headers be transmitted, therein facilitating identification of the start of the STS packets without utilization of a packet header.

In some implementations, the first communication circuit communicates a pre-poll message prior to communicating the headerless packets, and the processing circuitry uses the pre-poll message to timestamp synchronize the plurality of headerless packets. For instance, the processing circuitry may assess the TOF value based on a frequency offset between the respective communication circuits, and may further determine the frequency offset based on a delay time between reception of the pre-poll message and the headerless packets.

In certain embodiments, the first communication circuit communicates respective ones of the plurality of headerless packets in parallel, and the processing circuitry assesses the TOF value utilizing ones of the packets communicated in parallel. The second communication circuit may include multi-receiver circuitry to concurrently receive different packets communicated in parallel.

In some embodiments, the first communication circuit is a key FOB and the second communication circuit is located in an automobile with the processing circuit. The processing circuit utilizes the determined distance and security data communicated between the key FOB and the first communication circuit to enable operation of the automobile in response to the key FOB being within a defined proximity of the automobile and the security data authenticating the key FOB. Enabling operation may, for example, include unlocking a door and/or enabling an ignition system for operating an engine or battery/system of the automobile.

Figure 1:
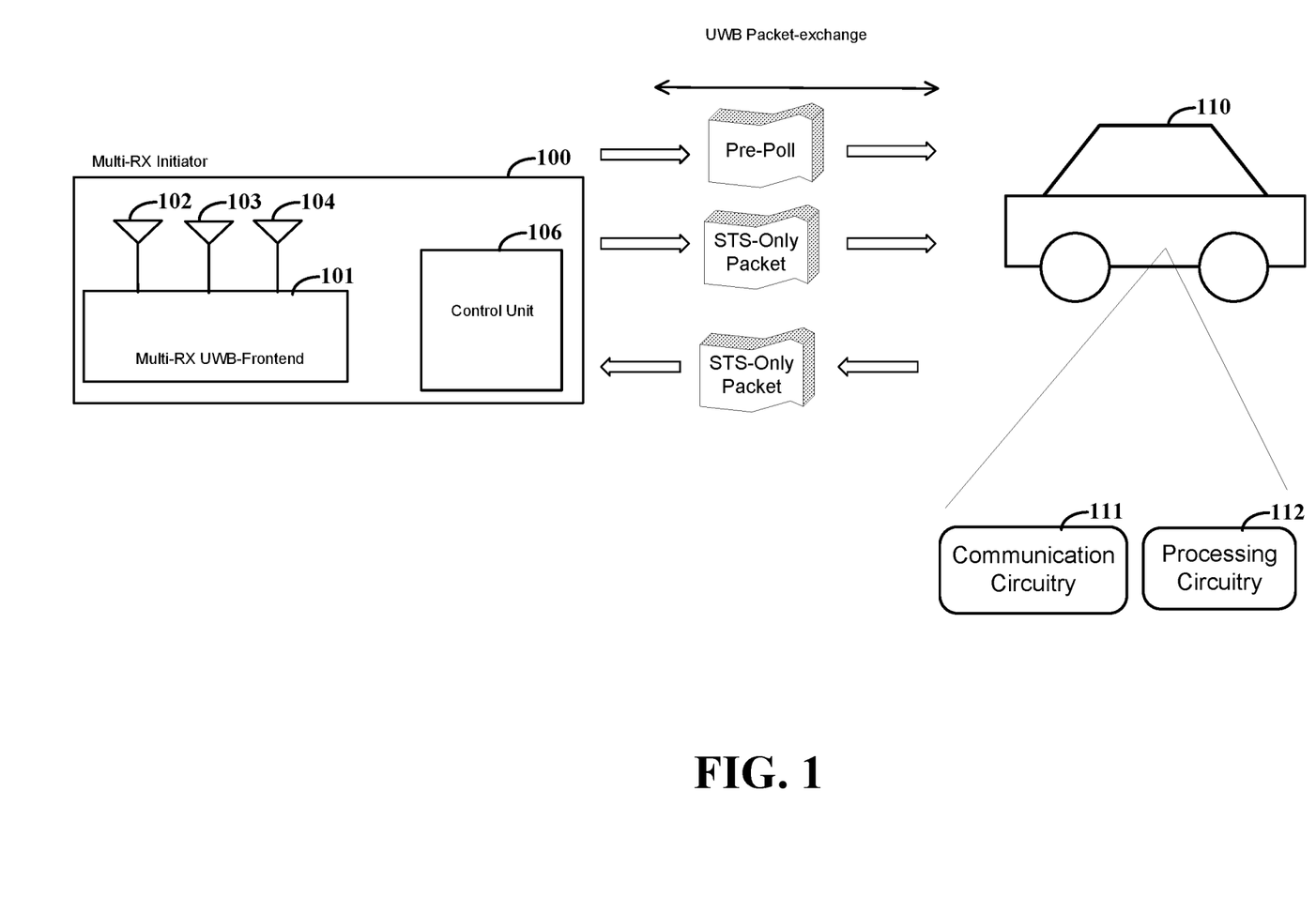
FIG. 1 shows a system for communicating and distance estimation using STS-only frames, as may be implemented in accordance with various embodiments.

Turning now to the figures, FIG. 1 shows a system for communicating and distance estimation using STS-only frames, as may be implemented in accordance with various embodiments. Such an approach may include one or both of transmitter and receiver-side circuitry and related processing operations. A multi-RX initiator 100 includes a frontend circuit 101 with antennas 102, 103 and 104 for communicating packets including headerless STS-only packets, and a control unit 106 that may control the operation thereof. Communication circuitry 111 and processing circuitry 112, shown by way of example as being implemented in an automobile 110, operate to receive and process the headerless STS-only packets for ranging. Such a multi-RX may be utilized for receiving multiple frames in parallel. For instance, pre-poll data may be transmitted to the automobile 110, followed by an STS-only packet. The communication circuitry 111 and processing circuitry 112 process the pre-poll and STS-only packets and respond by communicating an STS-only packet in return as shown. The automobile 110 may include multiple anchor circuits (e.g., six), that operate with the triple-receiver initiator 100. Each packet transmitted from the automobile 110 may be received by all receivers of the initiator 100, and every packet transmitted by the initiator may be received by every car anchor. Various additional communications may be further carried out for determining a distance (e.g., via TOF) between the automobile 110 and the multi-RX initiator 100, for instance as characterized in FIG. 2 and otherwise herein.

While FIG. 1 is characterized above with multi-RX communications, various embodiments are directed to communicating STS-only frames with single-RX circuitry. Further, multi-RX circuitry may be utilized to receive multiple STS-only frames in parallel, or multiple receivers may be utilized to listen to the same signal (e.g., for angle of arrival determination).

Figure 2:
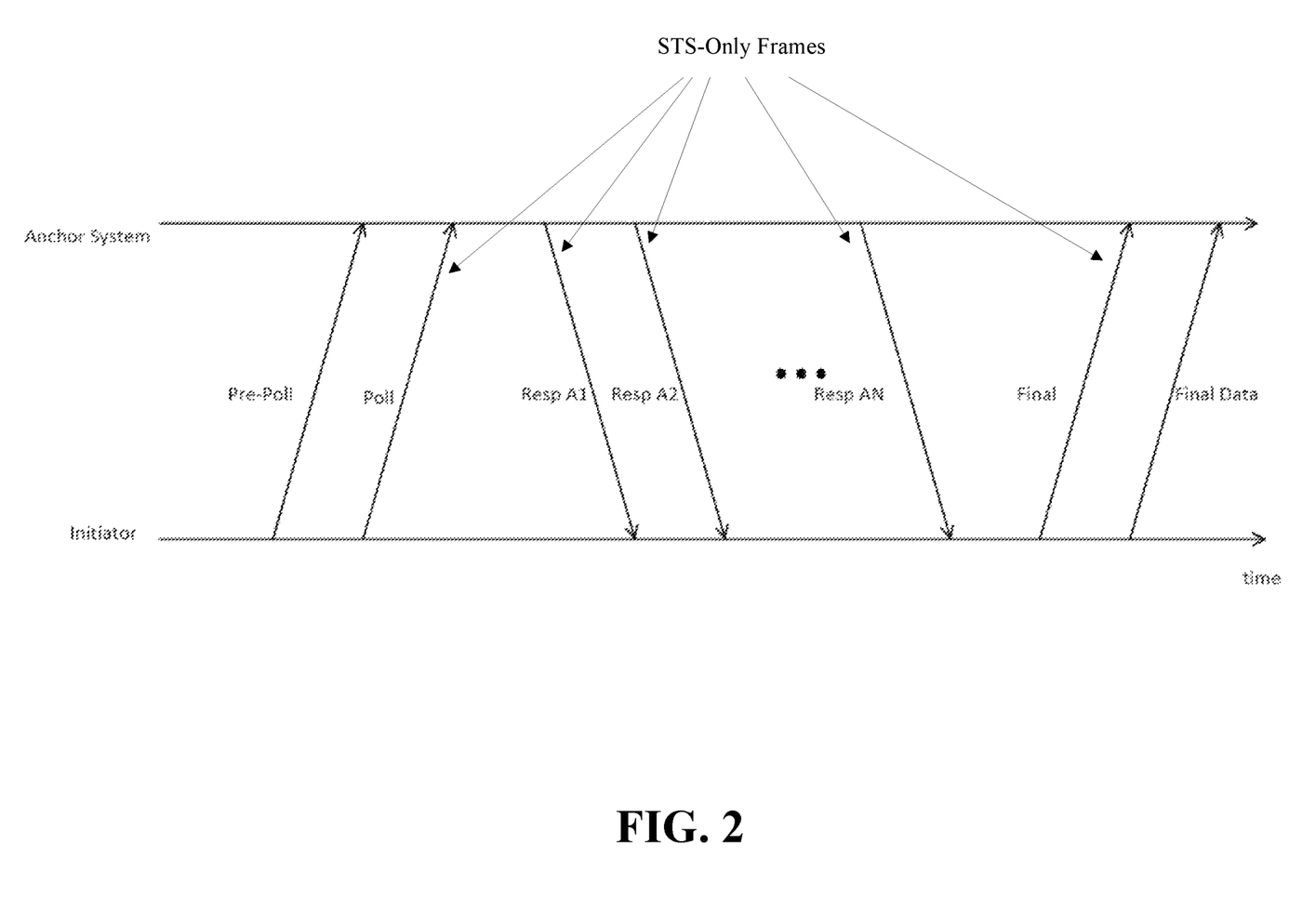
FIG. 2 shows an approach for assessing distance using STS-only packets, as may be implemented in accordance with one or more embodiments.

Referring to FIG. 2, an approach for assessing distance using STS-only packets is shown, as may be implemented in accordance with one or more embodiments. This approach may involve a fine ranging (FiRa) based double-sided two way ranging (DS-TWR) using STS-only frames that do not include a synchronization header such as may include SYNC and/or SFD data. Communications are shown between an initiator and anchor, for example as may respectively include a key FOB and one or more anchors in an automobile. A pre-poll message is sent from the initiator to the anchor, followed by a poll frame that is an STS-only frame. The receiver in the anchor system uses the pre-poll message for the actual timestamp synchronization. Responses A1, A2, and up to "N" numbers of responses (AN) are then sent by the anchor, also using STS-only frames. The initiator then sends a final STS-only frame followed by final data which may include a header and other information, for instance for authorizing a key FOB for opening a car door. The STS may be a non-repeating pseudo randomly generated pulse sequence, in which the receiver operates based on the sequence starting at the beginning of the packet knowing that the packet is STS-only.

Where anchors within the anchor system run on different clocks, the frequency offset between the initiator and the receiving anchors may be considered in processing. A pre-defined delay between the pre-poll message and the poll message at the anchor side can be calculated as shown in Equation (1):

$$T\_delay\_anchor = T\_predefined * k\_scaling\_initiator\_anchor \quad (1)$$

The time T_predefined may be drawn from an expected protocol timing (e.g., 1 ms), the scaling factor k_scaling_initiator_anchor compensates for the frequency offset between initiator, and each anchor and can be calculated as shown in Equation (2):

$$k\_scaling\_initiator\_anchor = \frac{T\_predefined\_anchor}{T\_predefined\_initiator} = \frac{f\_initiator}{f\_anchor} \quad (2)$$

In Equation (2), T_predefined_anchor and T_predefined_initiator may be actual physical device timings measured by an ideal reference clock.

The actual frequency ratio between the initiator and the anchors can be measured at the anchor side by measuring the carrier frequency offset (CFO) during the reception of a preamble (SYNC) or other parts of the pre-poll frame. Once the anchor knows the CFO estimation it can consider it and start the reception of the STS a bit earlier or later depending on the actual value. This delay time scaling may be considered at the anchor side for the calculation of the actual transmission of the response message, for instance where the initiator has no possibility for measuring and compensating for the CFO on its own at this point. In the ranging sequence, there may be one initiator operating with multiple anchors, meaning the initiator clock is a reasonable choice to provide a common time basis of the system. Once all the responses have been received on the initiator side, the initiator can transmit the final and final data packet according to its own clock since it is the common time reference. The anchors operate with the time scaling factor for proper STS reception.

On the responder side, reception can be estimated with an accuracy of a few nanoseconds where the limiting factor is CFO estimation accuracy. Assuming a CFO inaccuracy of 0.1 ppm and a worst-case pre-poll to poll message delay of 8 ms, the RX-start error may be about 0.8 ns, which may be neglected compared to relatively large (~1 us) symbol correlation buffer on common receivers. Assuming the responder transmits its response packet 2 ms after receiving the poll packet, the initiator will receive this message one TOF after the time when the signal has been transmitted. As responder does not have timing of the delay, the message reception on the initiator will be 2*TOF late. This behavior is shown in equation (3):

$$T_{delay,real} = \quad (3)$$
$$TOF_{initiator,responder} + T_{delay} + TOF_{responder,initiator} = T_{delay} + 2*TOF$$

Figure 3:
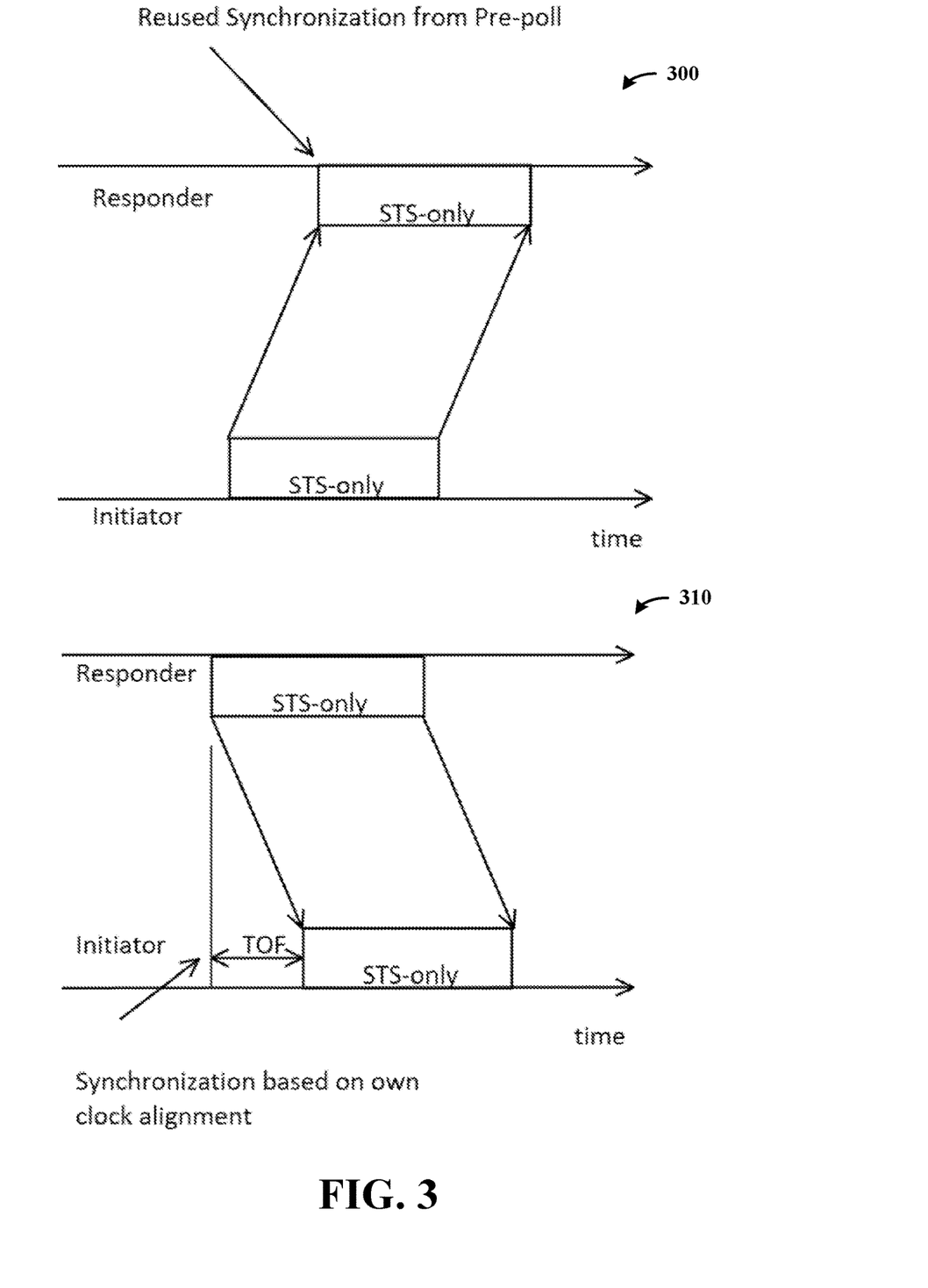
FIG. 3 shows a time synchronization approach, as may be implemented in accordance with one or more embodiments.

FIG. 3 shows a time synchronization approach, as may be implemented in accordance with one or more embodiments. Plot 300 shows timing of an STS-only packet as transmitted by an initiator and received by a responder, which may re-use synchronization from a pre-poll message (e.g., as shown in FIG. 2). Plot 310 shows timing of a responder-transmitted STS-only packet and as received at an initiator. Signal acquisition on the STS can be run for re-aligning the timing and the phase behavior of the signal. After this acquisition, which takes a few symbols, all of the STS-only packet can be received at a correct point in time and the phase can be tracked properly and avoid suffering from frequency offsets. Once the TOF and CFO have been measured on the initiator side, it can be compensated in the next ranging rounds based on the last estimate.

The previous approach exploiting STS-only frames allows us to reduce the frame duration by only including the STS segment needed for secure ranging instead of full IEEE standardized SP3 frames. However, this still requires consecutive transmissions from the different responders (anchors) to the initiator device, which make it difficult to dramatically reduce the ranging exchange duration. To achieve this, concurrent transmissions from anchors/responders may be utilized with a multi-receiver initiator device that may listen and measure the timestamp to multiple responders in parallel.

Figure 4:
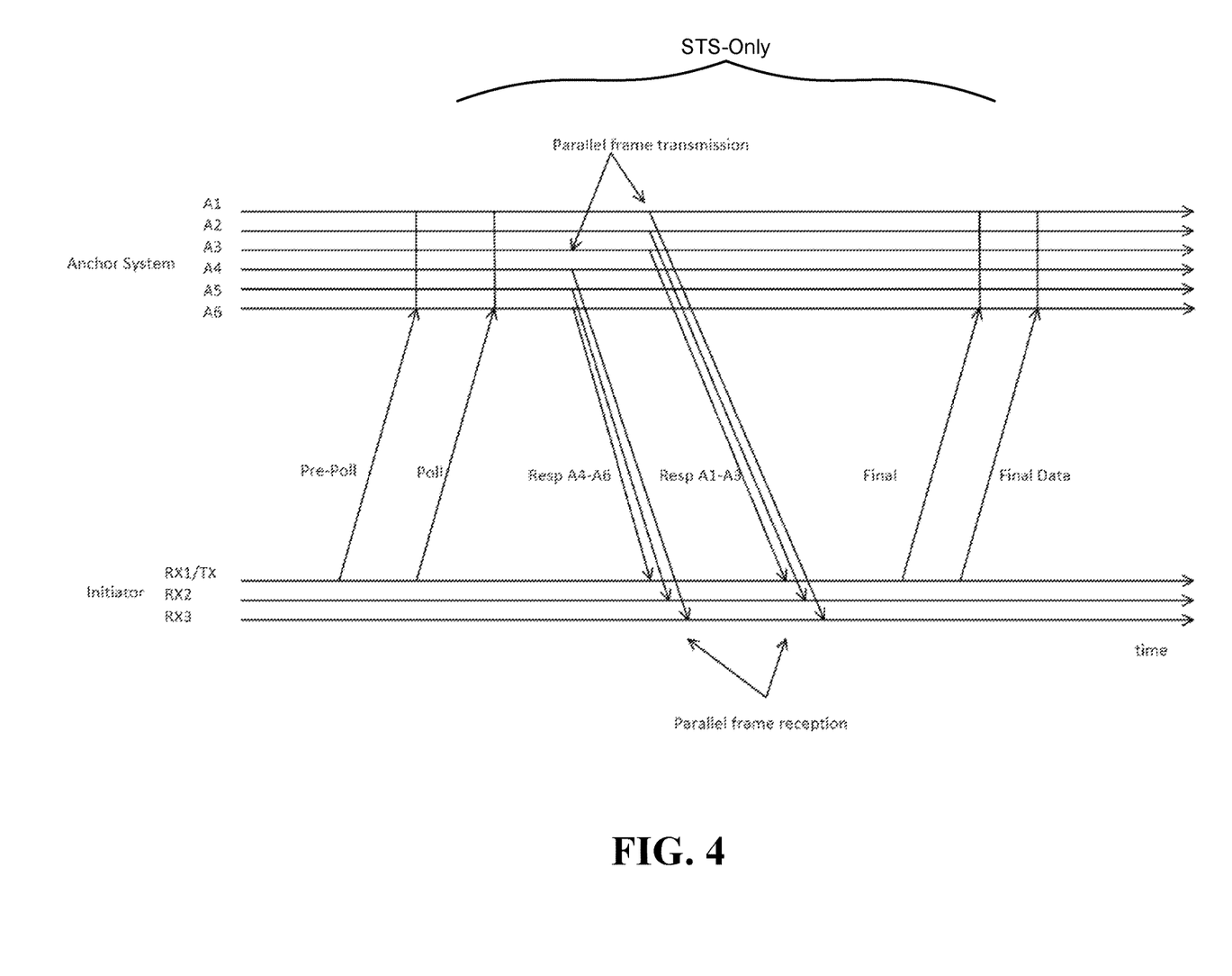
FIG. 4 shows parallel STS-only communications, as may be implemented in accordance with one or more embodiments.

FIG. 4 shows parallel STS-only communications, as may be implemented in accordance with one or more embodiments, for instance in connection with FIG. 1. A message exchange starts similar to the ranging approach shown in FIG. 2 with transmission of pre-poll and poll messages, with the packets received by every anchor of an anchor system (here, shown as Anchors A1-A6). After the poll packet reception, the anchors transmit their response messages with responses from A4-A6 transmitted in parallel followed by responses from A1-A3 also transmitted in parallel. Every receiver on the initiator side may correlate on a different STS, considering the length of the non-repeating STS sequence which provides desirable isolation of different STS codes relative, for example, to preamble codes. Final and final data messages are then sent from the initiator to the anchors. All messages except the pre-poll and final data messages may be transmitted using STS-only frames. Using such approaches, power consumption may be cut in about half by using such STS-only packets, such that buffer capacitors and batteries for powering such a UWB subsystem can be scaled down by a factor of about two. If three receivers are used in parallel for the STS-only packet reception on the responder side, the idle time may be reduced by a factor of 3 since there are 3 times fewer ranging slots within the ranging sequence, which facilitate session scheduling and reduced power consumption. Furthermore, if ranging is carried out using STS-only packets, it may be more difficult for an attacker to determine the start of the ranging packets since they are based on a continuously changing pseudo random sequence, meaning there is no constant preamble the attacker can synchronize on. In addition, a non-repeating STS pattern may be used to facilitate co-existence of multiple devices. Transmission power may be increased relative to the shorter packet duration achieved using STS-only packets (e.g., at twice the power), providing a link budget gain for ranging frames.

In some embodiments, signals received by multiple anchors may be combined. If an anchor is not able to receive a packet of the pre-poll message, the anchor may utilize synchronization data of the other anchors so it can still try to receive STS-only packets, which have a drastically increased link budget. In certain implementations, a synchronization header is utilized in a Poll packet (e.g., UWB-poll packet) or a secondary radio (e.g., a narrowband radio) can be used to provide coarse synchronization.

Figure 5:
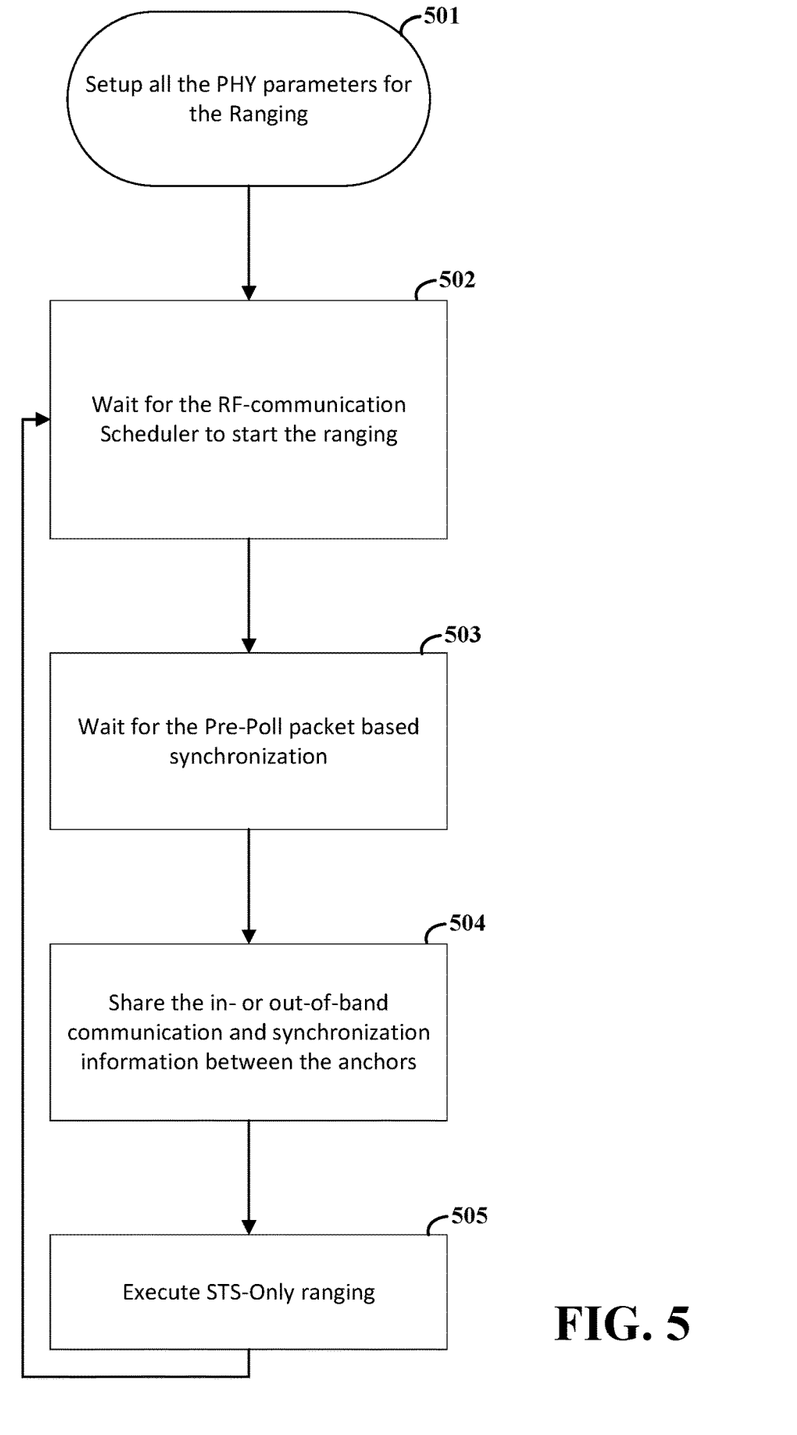
FIG. 5 shows a flow chart for STS-only ranging with multiple anchors, as may be implemented in accordance with one or more embodiments.

FIG. 5 shows a flow chart for STS-only ranging with multiple anchors, as may be implemented in accordance with one or more embodiments. At 501, the initiator and the anchor system agree on common PHY parameters, which may be performed using an out-of-band communication channel. Once the parameters have been exchanged, the anchor system waits until the communication scheduler starts a first ranging step at 502, based on the previously agreed timing and PHY parameters. At 503, the anchor system turns on its receivers and waits for a pre-poll message, which may be transmitted in-band or out-of-band. As soon as an anchor has received the pre-poll message, it shares the derived synchronization information with all the other anchors at 504. Based on this synchronization information (e.g., a CFO offset and a timestamp), the anchors can set up STS-only packet reception on their side. Using this sharing approach, anchors with the best link budget can be taken as reference for sharing the synchronization information among all the anchors. Once the synchronization data has been shared, the anchors execute STS-only based ranging at 505. A final data message can then be transmitted in-band or out-of-band, after which the devices can go back into the "Wait for scheduler state" at 502 until the next ranging session is initiated.

In contexts used herein, a packet is a group or stream of bits whether or not the bits are in a fixed size and/or whether or not the bits are in a contiguous sequence. Furthermore, a "header", for purposes of the disclosure, is a set of bits forming a code that might be used in any part of a packet that serves a purpose of encoding data in communications to the receiving terminal (e.g., synchronization, identification and/or recognition of a packet) and whether or not the bits might be in the front of the packet.

As examples, the specification describes and/or illustrates aspects useful for implementing the claimed disclosure by way of various circuits or circuitry which may be illustrated as or using terms such as blocks, modules, device, system, unit, controller, anchor, initiator and/or other circuit-type depictions (e.g., reference numerals 100, 101, 106, 111 and 112 of FIG. 1 may depict such a block/module as described herein). Such circuits or circuitry may be used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing operations such as TOF determination and distance estimation. Yet another process or method in this context would be recognized in connection with the functions/activities associated with FIGS. 2-5 and carried out in connection with FIG. 1.

For example, in certain of the above-discussed embodiments, one or more modules are discrete logic circuits or programmable logic circuits configured and arranged for implementing these operations/activities, as may be carried out in the approaches shown in FIGS. 2-5. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described in connection with FIG. 5 and/or with communications as shown in FIGS. 2-4, is used by such a programmable circuit to perform the related steps, functions, operations, activities, etc. Depending on the application, instructions and/or configuration data can be configured for implementation in logic circuitry, with the instructions (whether characterized in the form of object code, firmware or software) stored in and accessible from a memory (circuit). As another example, where the Specification may make reference to a "first communication circuit", a "second communication circuit", etc., the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to communicate . . . " is interpreted as "circuit configured to communicate . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, additional or fewer anchors, or additional or fewer transmitters and/or receivers on an initiator, may be used to carry out operations in a manner as claimed. Furthermore, different types of communications used in contexts other than automotive and/or ranging may be carried out in similar ways and/or using similar structure. Such modifications do not depart from the true spirit and scope of various aspects of the disclosure, including aspects set forth in the claims.

What is claimed is:

1. A method comprising:
   communicating a plurality of headerless packets, respectively including scrambled timestamp sequence (STS) packets but not including encoding headers, between respective communication circuits;
   assessing a time of flight (TOF) value indicative of time elapsed between transmission and reception of the plurality of headerless packets based on the STS packets; and
   determining a distance between the communication circuits based on the assessed time of flight.

2. The method of claim 1, wherein each of the plurality of headerless packets is a group or stream of bits, irrespective of whether the bits are in a fixed size or are in a contiguous sequence, that does not provide a code used in any part of the group or stream of bits to encode data, for synchronization, identification and/or recognition of a packet, in communications to one of the communication circuits.

3. The method of claim 1, wherein determining the time of flight value includes identifying the start of the STS packets based on a ranging protocol specifying that STS-only packets without headers are being transmitted, therein facilitating identification of the start of the STS packets without utilization of a packet header.

4. The method of claim 1, further including communicating a pre-poll message prior to communicating the headerless packets, and using the pre-poll message for timestamp synchronization.

5. The method of claim 4, wherein assessing the TOF value is carried out based on a frequency offset between the respective communication circuits.

6. The method of claim 5, further including determining the frequency offset based on a delay time between reception of the pre-poll message and the headerless packets.

7. The method of claim 1, wherein communicating the plurality of headerless packets includes communicating respective ones of the packets in parallel and wherein assessing the TOF value includes utilizing the ones of the packets communicated in parallel.

8. The method of claim 7, wherein communicating the plurality headerless packets includes using multi-receiver circuitry to concurrently receive different packets communicated in parallel.

9. The method of claim 1, wherein assessing the TOF value includes determining the TOF value without utilizing synchronization data.

10. The method of claim 1, wherein one of the communication circuits is a key FOB and the other one of the communication circuits is based in an automobile and includes processing circuitry, further including utilizing the determined distance and security data communicated from the key FOB to the automotive-based circuit to enable operation of the automobile in response to the key FOB being within a defined proximity of the automobile and the security data authenticating the key FOB.

11. An apparatus comprising:
a first communication circuit to communicate a plurality of headerless packets, respectively including scrambled timestamp sequence (STS) packets but not including encoding headers, with a second communication circuit; and
processing circuitry to assess a time of flight (TOF) value indicative of time elapsed between transmission and reception of the plurality of headerless packets based on the STS packets, and to determine a distance between the communication circuits based on the assessed time of flight.

12. The apparatus of claim 11, wherein each of the plurality of headerless packets is a group or stream of bits, irrespective of whether the bits are in a fixed size or are in a contiguous sequence, that does not provide a code used in any part of the group or stream of bits to encode data, for synchronization, identification and/or recognition of a packet, in communications to one of the communication circuits.

13. The apparatus of claim 11, wherein the processing circuitry is configured to determine the time of flight value by identifying the start of the STS packets based on a ranging protocol specifying that STS-only packets without headers be transmitted, therein facilitating identification of the start of the STS packets without utilization of a packet header.

14. The apparatus of claim 11, wherein the first communication circuit is configured to communicate a pre-poll message prior to communicating the headerless packets, and the processing circuitry is configured to use the pre-poll message to timestamp synchronize the plurality of headerless packets.

15. The apparatus of claim 14, wherein the processing circuitry is configured to assess the TOF value based on a frequency offset between the respective communication circuits.

16. The apparatus of claim 15, wherein the processing circuitry is configured to determine the frequency offset based on a delay time between reception of the pre-poll message and the headerless packets.

17. The apparatus of claim 11, wherein the first communication circuit is configured to communicate respective ones of the plurality of headerless packets in parallel, and the processing circuitry is configured to assess the TOF value utilizing ones of the packets communicated in parallel.

18. The apparatus of claim 17, wherein the second communication includes multi-receiver circuitry to concurrently receive different packets communicated in parallel.

19. The apparatus of claim 11, wherein the processing circuitry is configured to determine the TOF value without utilizing synchronization data.

20. The apparatus of claim 11, wherein:
the first communication circuit is a key FOB and the second communication circuit is based in an automobile; and
the processing circuit is configured to utilize the determined distance and security data communicated between the key FOB and the second communication circuit to enable operation of the automobile in response to the key FOB being within a defined proximity of the automobile and the security data authenticating the key FOB.

* * * * *